(12) United States Patent
Yi et al.

(10) Patent No.: US 11,022,023 B2
(45) Date of Patent: Jun. 1, 2021

(54) FLOW CONTROL VALVE

(71) Applicants: Hyundai Motor Company, Seoul (KR); Kia Motors Corporation, Seoul (KR)

(72) Inventors: Jea Woong Yi, Gyeonggi-do (KR); Cheol Soo Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 16/003,629

(22) Filed: Jun. 8, 2018

(65) Prior Publication Data

US 2019/0178148 A1    Jun. 13, 2019

(30) Foreign Application Priority Data

Dec. 11, 2017    (KR) .................... 10-2017-0168910

(51) Int. Cl.
| | | |
|---|---|---|
| *F01P 7/14* | (2006.01) | |
| *F01P 3/20* | (2006.01) | |
| *F16K 11/00* | (2006.01) | |

(52) U.S. Cl.
CPC .................... *F01P 7/14* (2013.01); *F01P 3/20* (2013.01); *F01P 2007/146* (2013.01); *F01P 2060/04* (2013.01); *F01P 2060/12* (2013.01); *F01P 2060/18* (2013.01); *F16K 11/00* (2013.01)

(58) Field of Classification Search
CPC ............ F01P 2007/146; F16K 11/0876; Y10T 137/86493

USPC ....................................................... 123/41.08
See application file for complete search history.

(56) References Cited

U.S. PATENT DOCUMENTS

| | | | |
|---|---|---|---|
| 9,518,503 B2 * | 12/2016 | Tsuchiya ................... | F01P 7/16 |
| 9,745,888 B2 * | 8/2017 | Lee .......................... | F01P 7/165 |
| 10,161,292 B1 * | 12/2018 | Park .......................... | F01P 3/20 |
| 2005/0034688 A1 * | 2/2005 | Lelkes ................... | F16K 11/074 |
| | | | 123/41.01 |
| 2008/0245319 A1 * | 10/2008 | Toyoshima ......... | F28D 20/0034 |
| | | | 123/41.14 |
| 2013/0160723 A1 * | 6/2013 | Miyagawa ................ | F01P 7/16 |
| | | | 123/41.1 |
| 2015/0122359 A1 | 5/2015 | Tsuchiya et al. | |
| 2015/0361865 A1 * | 12/2015 | Lee .......................... | F02M 26/28 |
| | | | 123/41.08 |

(Continued)

FOREIGN PATENT DOCUMENTS

| | | |
|---|---|---|
| JP | 2002276365 A | 9/2002 |
| JP | 2004-137981 A | 5/2004 |

(Continued)

*Primary Examiner* — Long T Tran
*Assistant Examiner* — James J Kim
(74) *Attorney, Agent, or Firm* — Mintz Levin Cohn Ferris Glovsky and Popeo, P.C.; Peter F. Corless

(57) ABSTRACT

A flow control valve is provided to adjust the flow rate of coolant and a variable-separation-cooling process at the same time by adjusting the opening degree of the flow control valve. The ports are controlled simultaneously in a variable manner merely by the operation of the flow control valve and thus, a variable temperature control process for increasing the temperature of the entire engine, rapid engine warm-up, and a separated cooling process at the same time is realized.

7 Claims, 7 Drawing Sheets

(56) References Cited

U.S. PATENT DOCUMENTS

| | | | | |
|---|---|---|---|---|
| 2016/0040585 | A1* | 2/2016 | Schaefer | F01P 3/20 |
| | | | | 137/1 |
| 2016/0230642 | A1 | 8/2016 | Bilancia et al. | |
| 2017/0030251 | A1* | 2/2017 | Watanabe | F02D 41/04 |
| 2017/0055877 | A1* | 3/2017 | Niemeyer | A61B 5/0077 |
| 2017/0321595 | A1* | 11/2017 | Jang | F16K 5/12 |
| 2018/0051621 | A1* | 2/2018 | Yi | F01P 7/16 |

FOREIGN PATENT DOCUMENTS

| | | | |
|---|---|---|---|
| JP | 2013238155 | A | 11/2013 |
| JP | 2014181654 | A | 9/2014 |
| JP | 5925456 | B2 | 5/2016 |
| JP | 2016128652 | A | 7/2016 |

\* cited by examiner

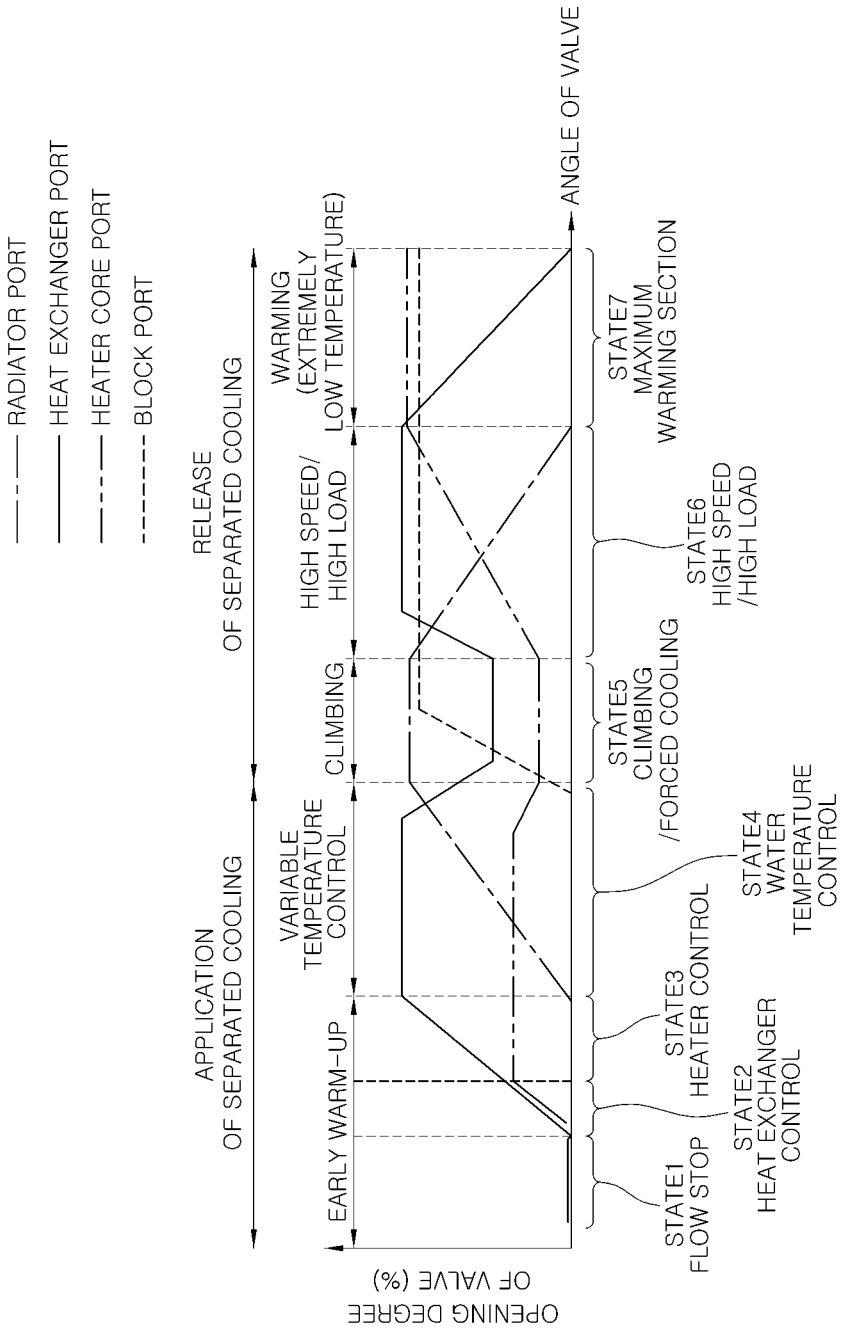

FLOW CONTROL VALVE

CROSS-REFERENCE TO RELATED APPLICATION

This application claims the priority benefit of Korean Patent Application No. 10-2017-0168910, filed on Dec. 11, 2017, the disclosure of which is incorporated herein by reference.

BACKGROUND

1. Field of the Invention

The present invention relates to a flow control valve for a vehicle, and more particularly, to a flow control valve that adjusts the flow rate of coolant in a heat exchanger and other cooling parts and a process of separately cooling a cylinder head and a cylinder block in a variable manner at the same time by adjusting the opening degree of an integrated coolant flow control valve.

2. Description of the Related Art

Generally, an engine of a vehicle exhibits poor fuel efficiency under a cold-starting condition in comparison to when the vehicle has been sufficiently warmed up. Particularly, under a cold-starting condition, friction in the engine is increased due to the high viscosity of oil attributable to the low temperature of the oil, a substantial amount of heat is lost through the wall of the cylinder due to the low temperature of the wall, and combustion is unstable.

Therefore, the temperature of the vehicle engine should be rapidly increased to a normal temperature in the early stage of engine startup to improve the fuel efficiency and durability of the engine. Heat control is performed to maximally use heat generated from the engine upon cold starting to warm up the engine to improve the fuel efficiency and output of the engine and to reduce exhaust emissions. Representative examples of such heat control technology include a flow stop valve, a clutch-type water pump, an electric water pump, and an integrated flow control valve.

The flow stop valve is installed at the outlet port or the inlet port of the engine to decrease an engine warm-up time by stopping the flow of coolant in the engine until the engine is warmed up. In a similar manner, the clutch-type water pump or the electric water pump adjusts the flow of coolant to rapidly warm up the engine.

The integrated flow control valve stops the flow of coolant in the engine and also adjusts the flow rate in a variable manner such that the coolant with an increased temperature is supplied to an oil warmer or an automatic transmission fluid (ATF) warmer, whereby the temperature of engine oil, the temperature of transmission oil and the temperature of the entire engine are increased rapidly at the same time, and consequently, the engine may be optimally and rapidly warmed up. When the temperature of the entire engine is increased to reduce friction in the piston of the engine and to minimize cooling loss, the temperature of the engine cylinder liner increases, friction loss of the piston decreases, and thus fuel efficiency is improved.

However, the temperature of the metal surfaces of the combustion chamber increases, which causes abnormal combustion, such as knocking, pre-ignition or the like, and unstable combustion. Accordingly, a cylinder head/block variable-separation-cooling technology has been developed, by which the temperature of the cylinder block is maintained high and the temperature of the head portion of the combustion chamber is maintained low. In other words, the temperature of the peripheral portion of the combustion chamber is controlled to be low to maintain stable combustion, and the temperature of coolant in the cylinder block is controlled to be high to reduce friction in the piston and the cylinder liner, thereby improving fuel efficiency.

The integrated flow control valve is opened or closed by regulating the opening degree of each port, which is connected to a corresponding flow passage, via the operation of a motor and thus, the opening degree of each port reaches a target value, thereby regulating the flow rate of the coolant that flows into or out of the valve through each port. However, the control technology using the integrated flow control valve does not employ the cylinder head/block variable-separation-cooling technology. Therefore, there is a need for a control technology that is capable of performing control of the flow rate of coolant and a variable-separation-cooling process at the same time by adjusting the opening degree of each port of the integrated flow control valve.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides a flow control valve that is capable of performing control of the flow rate of coolant and a variable-separation-cooling process at the same time by adjusting the opening degree of the flow control valve.

In accordance with the present invention, the above and other objects may be accomplished by the provision of a flow control valve that may include a valve housing having a block port connected to a coolant outlet of a cylinder block, a head port connected to a coolant outlet of a cylinder head, a radiator port connected to a radiator, a heat exchanger port connected to an oil cooler, and a heater core port connected to a heater core and an exhaust gas recirculation (EGR) cooler, a drive unit configured to supply rotational force, and a valve body configured to rotate at a predetermined angle inside the valve housing by the rotational force from the drive unit, the valve body selectively connecting each other with the block port and the radiator port and selectively connecting each other with the heat exchanger port and the heater core port based on a change in a rotation angle thereof.

The valve body may have an open end, and the head port may be formed in an end of the valve housing that corresponds to the open end of the valve body to be maintained in a continuously open state. The valve body may be divided into a first layer portion and a second layer portion in an axial direction thereof. The first layer portion may include a first flow control aperture, and an outlet of the block port and an inlet of the radiator port may be independently disposed in a circumferential direction of an inner surface of the valve housing that corresponds to the first layer portion.

The second layer portion may include a second flow control aperture, and an inlet of the heat exchanger port and an inlet of the heater core port may be independently disposed in a circumferential direction of an inner surface of the valve housing that corresponds to the second layer portion. The first flow control aperture and the second flow control aperture may be respectively formed in circumferential directions of the first layer portion and the second layer portion to selectively communicate with respective ports.

The flow control valve may further include a reservoir port disposed in the valve housing to be connected to a reservoir tank, and an inlet of the reservoir port may be formed in an inner surface of the valve housing that corresponds to the second layer portion to be maintained in a continuously open state. The flow control valve may further include sealing members disposed between an outer circumferential surface of the valve body and inlets and outlets of respective ports.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a graph showing the opening degree of ports in accordance with the rotation angle of the flow control valve according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
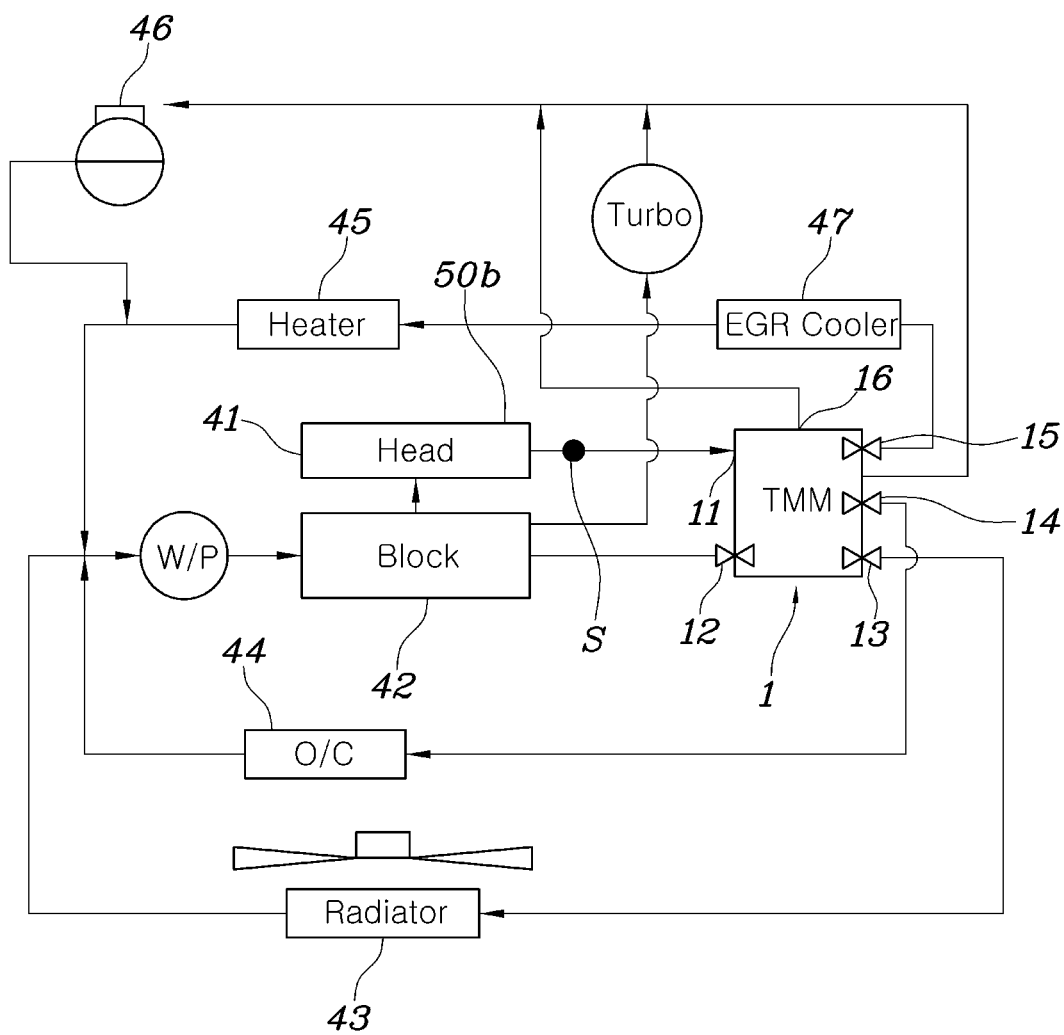
FIG. 1 is a view schematically showing the configuration of a cooling circuit in which a flow control valve according to an exemplary embodiment of the present invention is disposed.
Figure 2:
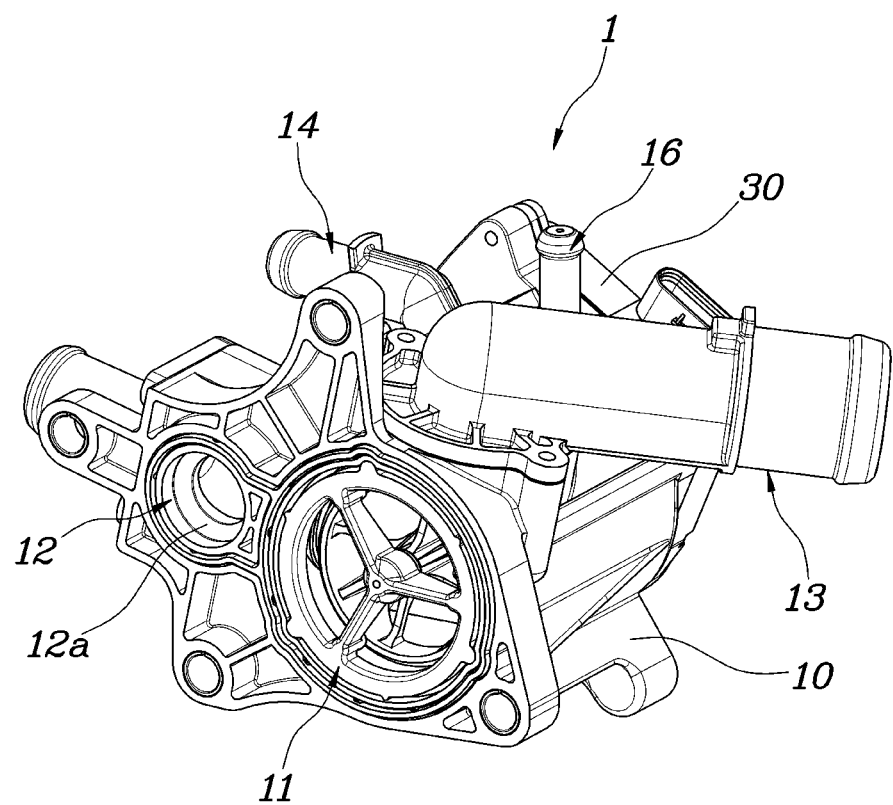
FIG. 2 is a perspective view illustrating the flow control valve according to an exemplary embodiment of the present invention when viewed from a head port and a block port.
Figure 3:
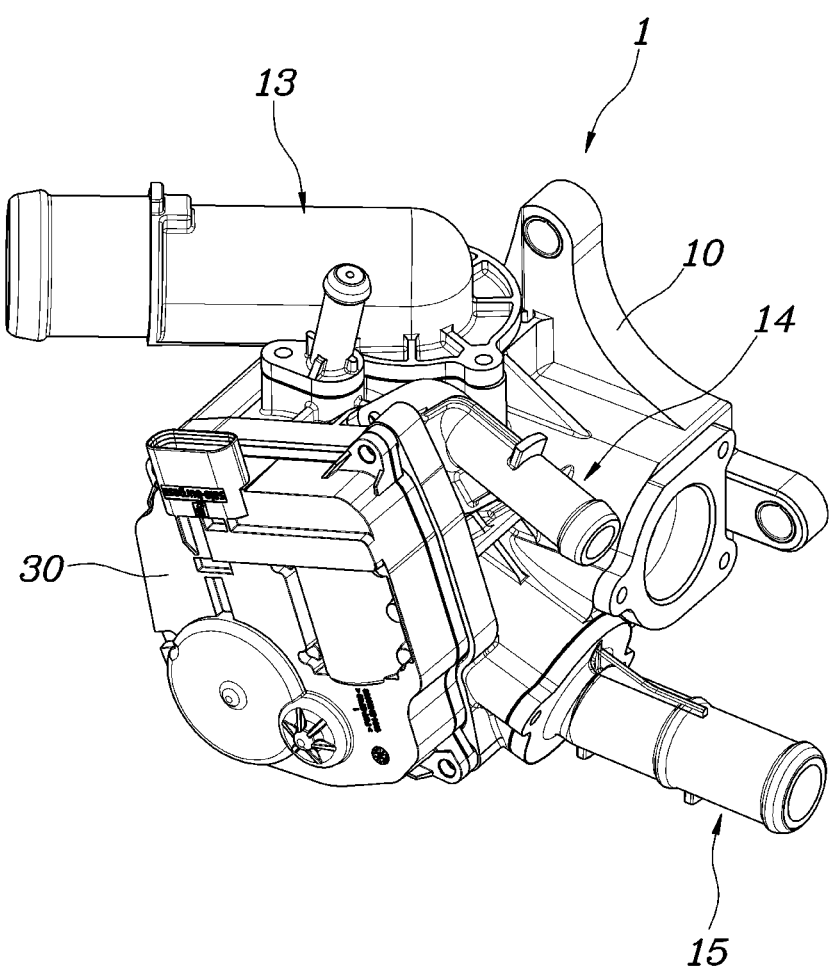
FIG. 3 is a perspective view illustrating the flow control valve according to an exemplary embodiment of the present invention when viewed from a drive unit.
Figure 4:
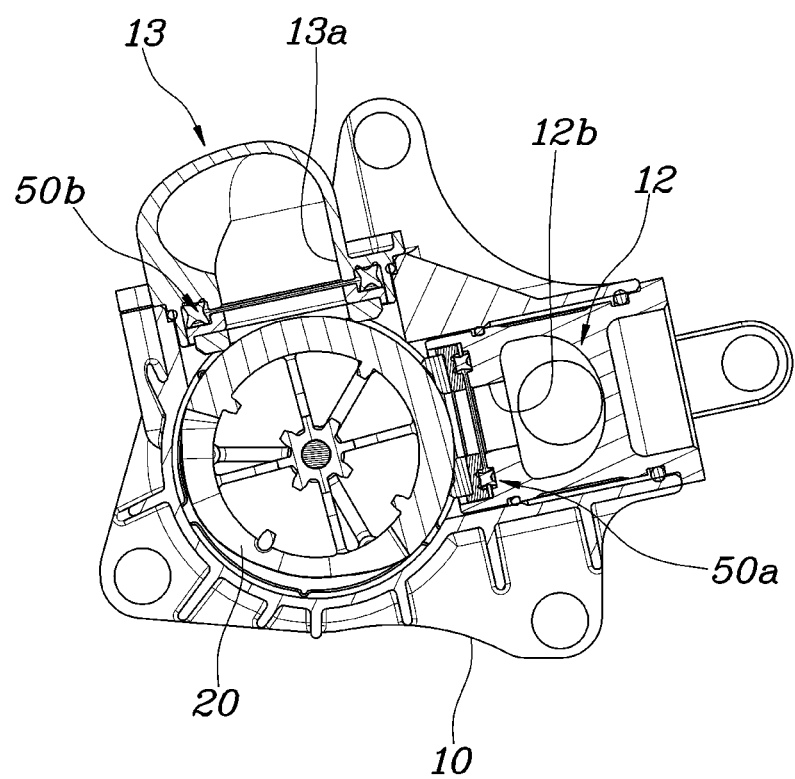
FIG. 4 is a cross-sectional view of a first layer portion of a valve body in the flow control valve according to an exemplary embodiment of the present invention.
Figure 5:
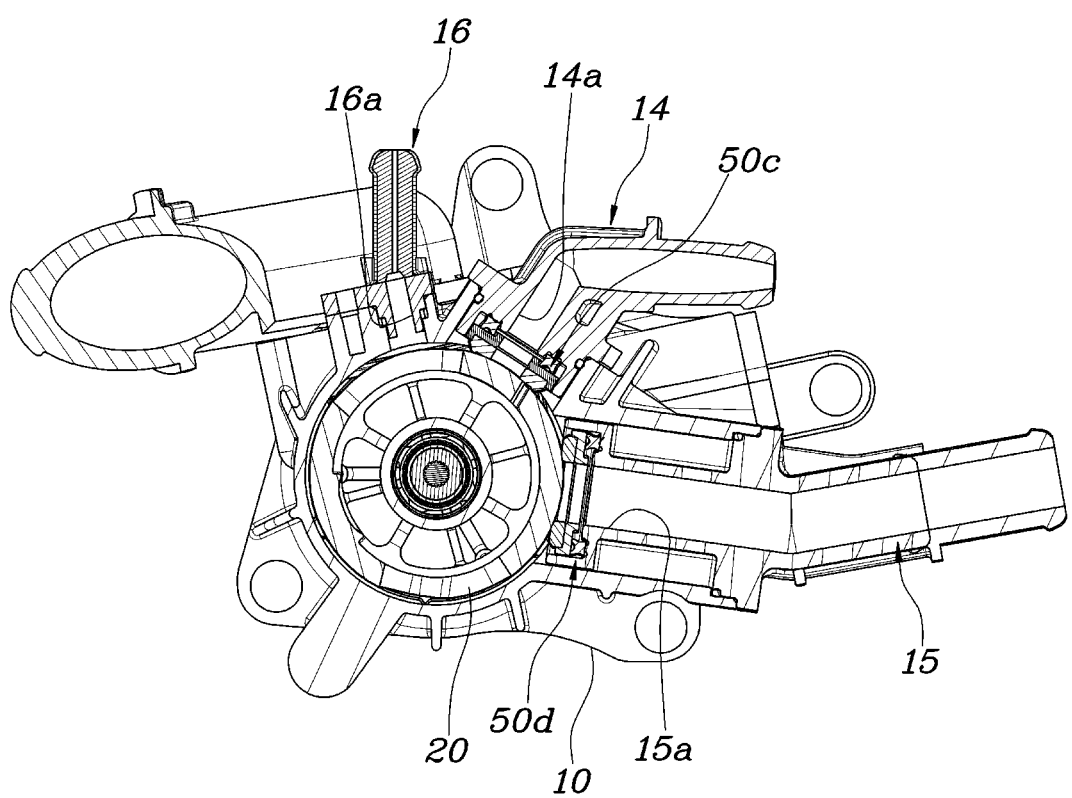
FIG. 5 is a cross-sectional view of a second layer portion of the valve body in the flow control valve according to an exemplary embodiment of the present invention.
Figure 6:
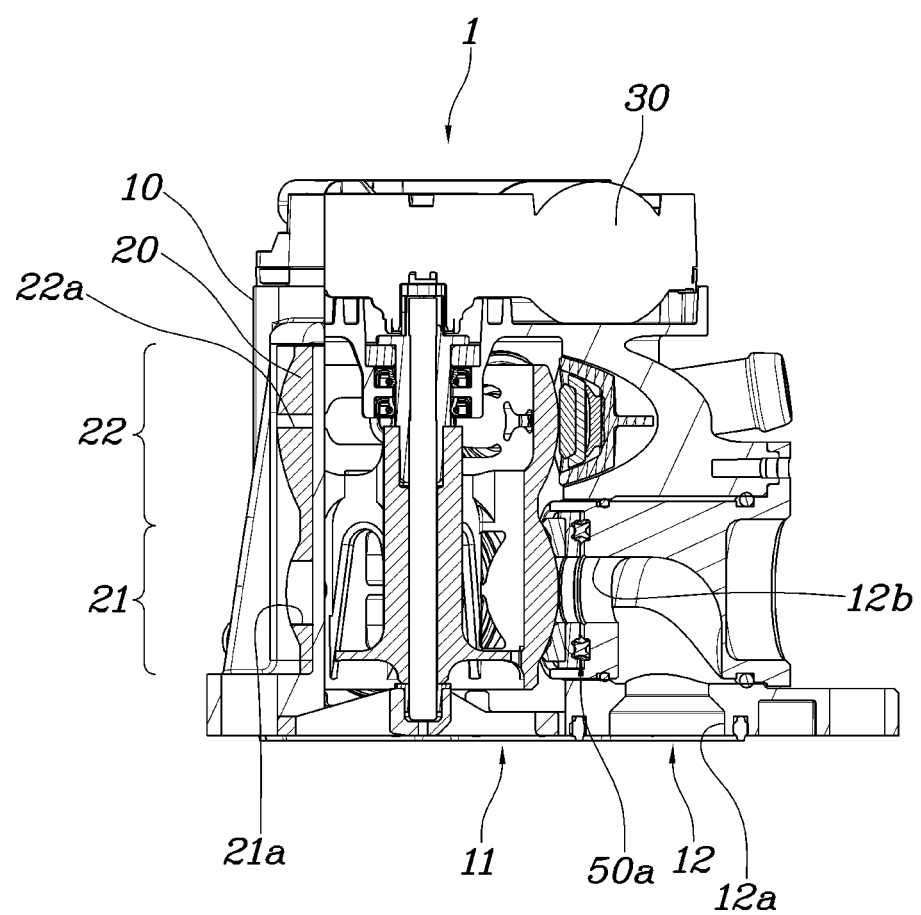
FIG. 6 is a cross-sectional view of the valve body when cut in the axial direction thereof in the flow control valve according to an exemplary embodiment of the present invention.

FIG. 1 is a view schematically showing a cooling circuit for a vehicle, which is applicable to the present invention. A flow control valve 1 of the present invention may be included in the cooling circuit. In particular, a coolant outlet of an engine cylinder block 42 and a coolant outlet of an engine cylinder head 41 may be independently connected to the flow control valve 1.

A block port 12 may be disposed at a portion of the flow control valve 1. The block port 12 may be connected to the coolant outlet of the cylinder block 42 to regulate the flow rate of the coolant that flows into the flow control valve 1. In addition, the flow control valve 1 may include at least three outlet ports, respectively connected to a radiator 43, a heat exchanger 44 such as an oil cooler or an oil warmer, a heater core 45, and an exhaust gas recirculation (EGR) cooler 47. The outlet ports regulate the flow rate of the coolant that flows out of the flow control valve 1.

The outlet ports may include a radiator port 13, a heat exchanger port 14, and a heater core port 15. A detailed description of the outlet ports will be provided later. Undescribed reference mark "S" is a coolant temperature sensor, and "W/P" is a water pump. The flow control valve 1 according to the present invention may include a valve housing 10, a drive unit 30, and a valve body 20.

Referring to FIGS. 2 to 6, the valve housing 10 may include a block port 12, through which the coolant discharged from the engine cylinder block 42 may flow into the valve housing, and a head port 11, through which the coolant discharged from the engine cylinder head 41 may flow into the valve housing. In addition, the valve housing 10 may include the radiator port 13, the heat exchanger port 14, and the heater core port 15, through which the coolant may flow out of the valve housing.

The block port 12 may be connected to the coolant outlet of the cylinder block 42, and may be formed inside the valve housing 10. The head port 11 may be connected to the coolant outlet of the cylinder head 41, and may be formed at the lower end portion of the valve housing 10. The radiator port 13 may be connected to a flow passage in which the radiator 43 is disposed, and may be formed in the shape of a pipe at a portion of the side surface of the valve housing 10.

The heat exchanger port 14 may be connected to a flow passage in which the heat exchanger 44, such as the oil cooler or the oil warmer, is disposed, and may be formed in the shape of a pipe (e.g., hollow cylindrical shape) at a portion of the side surface of the valve housing 10. The heater core port 15 may be connected to a flow passage in which the heater core 45 is disposed, and may be formed in the shape of a pipe at a portion of the side surface of the valve housing 10.

Further, the drive unit 30 may be installed at the upper end portion of the valve housing 10, and may be configured to supply rotational force to the valve body 20. In particular, the driving unit 30 may be a motor. The valve body 20 may be formed in the shape of a hollow container. The valve body 20 may include a rotary shaft that extends in the axial direction thereof. The rotational force of the drive unit 30 may be transferred to the valve body 20 via the rotary shaft, and thus the valve body 20 may be rotated within a predetermined angular range inside the valve housing 10.

The valve body 20 may include a first flow control aperture 21a formed therein. In particular, the first flow control aperture 21a may be formed in the circumferential direction of the lower end portion of the side surface of the valve body 20 and thus, the valve body 20 may selectively communicate with the block port 12 and the radiator port 13 based on the change in the rotation angle thereof. Additionally, the valve body 20 may include a second flow control aperture 22a formed therein. In particular, is the second flow control aperture 22a may be formed in the circumferential direction of the lower end portion of the side surface of the valve body 20 and thus, the valve body 20 may selectively communicate with the heat exchanger port 14 and the heater core port 15.

When each of the flow control apertures overlaps the inlet or the outlet of a corresponding port of the plurality of ports due to the rotation of the valve body 20, the corresponding port may be opened to allow the coolant to flow through the port. Conversely, when each of the flow control apertures does not overlap the inlet or the outlet (e.g., do not cover the inlet or outlet) of a corresponding port of the plurality of ports due to the rotation of the valve body 20, the corresponding port may be closed to prevent the coolant from flowing through the port. Further, the valve body 20 may have an open lower end, and the head port 11 may be formed in the lower end of the valve housing 10, which corresponds to the lower end of the valve body 20. Therefore, the head port 11 may be maintained in a continuously open state. Since the outlet of the cylinder head 41 may be connected to the head port 11, the coolant discharged from the cylinder head 41 may be continuously introduced into the valve body 20.

The valve body 20 may be divided into a first layer portion 21 and a second layer portion 22 in the axial direction about which the valve body 20 rotates. For example, the first layer portion 21 may be disposed proximate to the head port 11, and the second layer portion 22 may be disposed proximate to the drive unit 30. The first flow control aperture 21a may be formed in the first layer portion 21 and the first flow control aperture 21a may be elongated in the circumferential direction in which the valve body 20 rotates.

An outlet 12b of the block port 12 and an inlet 13a of the radiator port 13 may be independently disposed in the circumferential direction of the inner surface of the valve housing 10 that corresponds to the first layer portion 21. In particular, the inlet 12a of the block port 12, through which the coolant flows from the cylinder block 42 into the valve housing 10, may be disposed in the side surface of the head port 11 disposed at the bottom surface of the valve housing 10. Therefore, the flow passage of the block port 12 may be formed inside the valve housing 10.

Furthermore, the second flow control aperture 22a may be formed in the second layer portion 22 and the second flow control aperture 22a may be elongated in the circumferential direction in which the valve body 20 rotates. An inlet 14a of the heat exchanger port 14 and an inlet 15a of the heater core port 15 may be independently disposed in the circumferential direction of the inner surface of the valve housing 10 that corresponds to the second layer portion 22. The valve housing 10 may further include a reservoir port 16 connected to a reservoir tank 46.

An inlet 16a of the reservoir port 16 may be disposed in the inner surface of the valve housing 10 that corresponds to the second layer portion 22. The inlet 16a of the reservoir port 16 may be maintained in a continuously open state regardless of the change in the rotation angle of the valve body 20. Therefore, the inlet 16a of the reservoir port 16 may continuously communicate with the reservoir tank 46. This configuration may be embodied by the shape of the second flow control aperture 22a or by forming an additional flow control aperture in the second layer portion 22.

In addition, sealing members 50a, 50b, 50c and 50d may be disposed between the outer circumferential surface of the valve body 20 and the inlets and outlets of the respective ports. For example, a first sealing member 50a may be disposed between the outlet 12b of the block port 12 and a corresponding portion of the outer circumferential surface of the first layer portion 21. A second sealing member 50b may be disposed between the inlet 13a of the radiator port 13 and a corresponding portion of the outer circumferential surface of the first layer portion 21.

A third sealing member 50c may be disposed between the inlet 14a of the heat exchanger port 14 and a corresponding portion of the outer circumferential surface of the second layer portion 22. A fourth sealing member 50d may be disposed between the inlet 15a of the heater core port 15 and a corresponding portion of the outer circumferential surface of the second layer portion 22. Since the sealing members 50a, 50b, 50c and 50d may be installed at the entrances of the ports formed in the inner surface of the valve housing 10 and may be in direct contact with the valve body 20, the sealing members create surface pressure and maintain airtightness, thereby preventing leakage of the coolant that flows through the respective ports.

FIG. 7 is a graph showing the opening degree of the ports in accordance with the rotation angle of the flow control valve 1 according to the present invention. The X-axis of the graph represents the entire rotation angle of the valve (sections from the left-end portion to the right-end portion), and the Y-axis of the graph represents the opening degree of the ports. Referring to FIG. 7, at the time of cold starting of the engine, the flow control valve 1 may be disposed at a predetermined first section STATE1, which includes one end portion of all rotation sections of the valve body 20 in the X-axis of the graph. In this section, the inlet 13a of the radiator port 13 and the outlet 12b of the block port 12 are closed, and the inlet 14a of the heat exchanger port 14 and the inlet 15a of the heater core port 15 are also maintained closed.

In this state, a minimal amount of coolant flows into the flow control valve 1 through the head port 11. Accordingly, the minimum amount of coolant flows through portions disposed outside the engine, and thus the temperature of the engine may be rapidly increased. Subsequently, when the temperature of the coolant reaches a predetermined level, the flow control valve 1 operates and may be disposed in a second section STATE2 subsequent to the first section STATE1. In this section, the inlet 15a of the heater core port 15 and the inlet 14a of the heat exchanger port 14 are partially opened to adjust the flow rate of the engine coolant.

In other words, after the flow stop is released, the flow rate of the coolant may be maintained low (e.g., below a predetermined rate) and the temperature of the coolant may gradually reach a target level, whereby the warm-up time of the engine is decreased.

Subsequently, when the temperature of the coolant and the temperature of the external air are equal to or greater than a predetermined level, the flow control valve 1 operates and may be disposed in a third section STATE3 subsequent to the second section STATE2. In this section, the inlet 15a of the heater core port 15 may be maintained in the partially opened state and the opening degree of the inlet 14a of the heat exchanger port 14 may be adjusted from the partially opened state to a completely opened state. Accordingly, the effects of the oil cooler may be maximized, and thus the temperature of the oil may be increased rapidly. As a result, fuel efficiency may be improved via the reduction of friction in the engine.

Generally, the third section is a heater control section, and the opening degree (open area/port sectional area) of the heater core port in the heater control section is usually set to less than 50%. However, depending on various variables such as flow rate of an engine water pump can be set appropriately. A case where the opening degree of the heater core port is 100% is when a heating priority mode is applied.

Generally, the heating priority mode is determined by using the outside temperature and the initial cooling water temperature, and the heating priority mode is applied when the temperature is minus 10° C. to minus 15° C.

In general, an entry temperature for the third section is determined between approximately 50° C. and a target cooling water temperature, and the target cooling water temperature is typically 80° C. to 110° C. The target cooling water temperature in a fuel efficiency priority period is typically 95° C. to 105° C. Subsequently, when the temperature of the coolant is equal to or greater than a threshold value, the flow control valve 1 operates and may be disposed in a fourth section STATE4 subsequent to the third section STATE5. In this section, the opening degree of the inlet 13a of the radiator port 13 may be changed while the inlet 15a of the heater core port 15 and the inlet 14a of the heat exchanger port 14 are maintained open. Accordingly, the target temperature of the coolant may be maintained greater than when a conventional thermostat is used. As a result, fuel efficiency may be improved.

Subsequently, when the temperature of the coolant reaches the target temperature of the coolant or greater, the flow control valve 1 operates and may be disposed in a fifth section STATE5 subsequent to the fourth section STATE4. In this section, the opening degree of the outlet 12b of the block port 12 may be changed while the inlet 13a of the radiator port 13 is maintained in the completely opened state. For example, maximum cooling performance may be ensured in a high-load state or when climbing and such that the flow rate of the coolant in the heater is reduced to the minimum level required for cooling/warming control while the flow rate of the coolant in the oil warmer is appropriately maintained.

Subsequently, when the temperature of the coolant reaches the target level or greater and the vehicle is driven in the high-speed/high-load state, the flow control valve 1 operates and may be disposed in a sixth section STATE6 subsequent to the fifth section STATE5. In this section, the opening degree of the inlet 13a of the radiator port 13 may be changed and the outlet 12b of the block port 12 may be completely opened. Accordingly, the separated cooling process may be released to thus protect the engine hardware.

Subsequently, when the temperature of the coolant and the temperature of the external air are less than a predetermined level, the flow control valve 1 operates and may be disposed in a seventh section STATE7 subsequent to the sixth section STATE6. In this section, the opening degree of the inlet 15a of the heater core port 15 and the opening degree of the outlet 12b of the block port 12 may be maximized. Accordingly, the flow of coolant may be concentrated in the heater core 45, and thus the warming performance of the vehicle may be enhanced. When the engine stops, the flow control valve 1 operates to be located in the fifth section STATE5, whereby all of the ports may be maintained open to discharge the coolant. Accordingly, the coolant may be prevented from freezing, and bubbles in the cooling circuit may be discharged.

As described above, the flow control valve 1 according to the present invention is characterized in that the valve body 20 may be rotated by the rotational force of the drive unit 30 and the opening degrees of the radiator port 13, the heat exchanger port 14, the heater core port 15 and the block port 12 may be adjusted based on the variation in the rotation angle of the valve body, thereby appropriately adjusting the flow of coolant based on the vehicle driving conditions.

In other words, the process of separately cooling the cylinder head 41 and the cylinder block 42 may be performed or released by opening or closing the block port 12 via the operation of the flow control valve 1. In addition, since the opening degrees of the radiator port 13, the heat exchanger port 14 and the heater core port 15 may be adjusted together, the four ports may be controlled in a variable manner simultaneously by the operation of the flow control valve 1. Further, fuel efficiency may be improved by realizing the separated cooling process, and manufacturing costs may be reduced by eliminating a separate port control structure for realizing the separated cooling process.

The control sections of the flow control valve 1 may also be variously constituted based on the vehicle driving conditions, and the operation of the flow control valve 1 may be adjusted sequentially via the control sections, whereby the operation amount and the number of operations of the flow control valve 1 are reduced. In addition, since the maximum warming section may be set, the flow rate of coolant in the heater core 45 may be maximized, and the coolant may be prevented from being unnecessarily lost to the oil heat exchanger, whereby fuel efficiency and warming performance may be improved maximally.

As is apparent from the above description, according to the present invention, since the four ports may be operated simultaneously in a variable manner merely by the operation of the flow control valve, it may be possible to realize the variable temperature control process for increasing the temperature of the entire engine, rapid engine warm-up, and the separated cooling process at the same time. As a result, fuel efficiency may be maximally improved and manufacturing costs may be reduced by eliminating a separate port control structure for realizing the separated cooling process.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:
1. A flow control valve, comprising:
   a valve housing having a block port connected to a coolant outlet of a cylinder block, a head port connected to a coolant outlet of a cylinder head, a radiator port con- nected to a radiator, a heat exchanger port connected to an oil cooler, and a heater core port connected to a heater core and an exhaust gas recirculation (EGR) cooler;

a drive unit configured to supply rotational force; and a valve body configured to rotate at a predetermined angle inside the valve housing by the rotational force from the drive unit, the valve body selectively connecting the block port and the radiator port and selectively connecting the heat exchanger port and the heater core port based on a change in a rotation angle thereof, wherein the valve body has an open end, and wherein the head port is formed in an end of the valve housing that corresponds to the open end of the valve body to be maintained in a continuously open state, wherein the valve body includes a first inlet that receives the coolant from the cylinder head and a second inlet that receives the coolant form the cylinder block, wherein the first inlet is the head port and the second inlet is the block port, wherein the valve includes a first outlet that leads the coolant to the radiator, and second outlet that leads the coolant to the heat exchanger, and a third outlet that leads the coolant to the heater core via the EGR cooler, wherein the first outlet is the radiator port, the second outlet is the heat exchanger port, and the third outlet is the heater core port, wherein when the radiator port, the block port, the heat exchanger port, and the heater core port are closed, coolant flows into the flow control valve through the head port, subsequently, open degrees of the heater core port and the heat exchanger port are increased from the closed state of the heater core port and the heat exchanger port to adjust the flow rate of the coolant, subsequently, the opening degree of the heater core port is maintained in a determined opened state and the opening degree of the heat exchanger port is adjusted to a completely opened state, and subsequently, the opening degree of the radiator port is changed while the opening degree of the heater core port is continuously maintained in the determined opened state and the opening degree of the heat exchanger port is maintained open in the completely opened state.

2. The flow control valve according to claim 1, wherein the valve body is divided into a first layer portion and a second layer portion in an axial direction thereof.

3. The flow control valve according to claim 2, wherein the first layer portion includes a first flow control aperture, and an outlet of the block port and an inlet of the radiator port are independently disposed in a circumferential direction of an inner surface of the valve housing that corresponds to the first layer portion.

4. The flow control valve according to claim 3, wherein the second layer portion includes a second flow control aperture, and an inlet of the heat exchanger port and an inlet of the heater core port are independently disposed in a circumferential direction of an inner surface of the valve housing that corresponds to the second layer portion.

5. The flow control valve according to claim 4, wherein the first flow control aperture and the second flow control aperture are respectively formed in circumferential directions of the first layer portion and the second layer portion to selectively communicate with respective ports.

6. The flow control valve according to claim 4, further comprising:

a reservoir port disposed in the valve housing to be connected to a reservoir tank, wherein an inlet of the reservoir port is formed in an inner surface of the valve housing that corresponds to the second layer portion to be maintained in a continuously open state.

7. The flow control valve according to claim 4, further comprising:

sealing members disposed between an outer circumferential surface of the valve body and inlets and outlets of respective ports.

* * * * *